US012623788B2

(12) United States Patent
Amari et al.

(10) Patent No.: US 12,623,788 B2
(45) Date of Patent: May 12, 2026

(54) OVERALL AIRCRAFT SYSTEM DATA COLLECTOR FOR PROGNOSTICS AND HEALTH MANAGEMENT

(71) Applicant: RTX Corporation, Farmington, CT (US)

(72) Inventors: Martin Amari, Glastonbury, CT (US); Xin Wu, Glastonbury, CT (US); Tyler W. Hayes, Rockford, IL (US)

(73) Assignee: RTX CORPORATION, Farmington, CT (US)

( * ) Notice: Subject to any disclaimer, the term of this patent is extended or adjusted under 35 U.S.C. 154(b) by 202 days.

(21) Appl. No.: 18/298,952

(22) Filed: Apr. 11, 2023

(65) Prior Publication Data

US 2024/0343399 A1     Oct. 17, 2024

(51) Int. Cl.
| | |
|---|---|
| *B64D 27/33* | (2024.01) |
| *B60L 3/12* | (2006.01) |
| *B60L 50/60* | (2019.01) |
| *B64D 27/10* | (2006.01) |
| *B64D 27/24* | (2006.01) |
| *B64D 31/00* | (2006.01) |
| *B64D 45/00* | (2006.01) |
| B64D 27/02 | (2006.01) |

(52) U.S. Cl.
CPC ................ *B64D 27/24* (2013.01); *B60L 3/12* (2013.01); *B60L 50/60* (2019.02); *B64D 27/10* (2013.01); *B64D 27/33* (2024.01); *B64D 31/00* (2013.01); *B64D 45/00* (2013.01); *B60L 2200/10* (2013.01); *B64D 27/026* (2024.01); *B64D 2045/0085* (2013.01)

(58) Field of Classification Search
None
See application file for complete search history.

(56) References Cited

U.S. PATENT DOCUMENTS

| | | |
|---|---|---|
| 9,086,462 B2 | 7/2015 | Mao |
| 9,519,029 B2 | 12/2016 | Trnka et al. |

(Continued)

FOREIGN PATENT DOCUMENTS

| | | |
|---|---|---|
| WO | 2006074636 A2 | 7/2006 |
| WO | 2022116203 A1 | 6/2022 |

OTHER PUBLICATIONS

Search Report issued in European Patent Application No. 24169790. 3; Application Filing Date Apr. 11, 2024; Date of Mailing Aug. 20, 2024 (7 pages).

*Primary Examiner* — Phutthiwat Wongwian
*Assistant Examiner* — Jacek Lisowski
(74) *Attorney, Agent, or Firm* — CANTOR COLBURN LLP

(57) ABSTRACT

A hybrid electric propulsion (HEP) system of an aircraft includes a gas turbine engine configured to generate rotational power, and an electric propulsion system configured to generate at least one of thrust or lift for operation of the aircraft. The propulsion system includes a propulsor and an electric motor configured to drive the propulsor. A controller is in signal communication with the gas turbine engine and the electric propulsion system. The controller operates the gas turbine engine based on an on-board engine model (OEM), monitors electrical parameters of the electric propulsion system, and updates the OEM in response to changes to the electrical parameters.

13 Claims, 3 Drawing Sheets

(56) References Cited

U.S. PATENT DOCUMENTS

| | | | |
|---|---|---|---|
| 10,253,734 B2 | 4/2019 | Jammoussi et al. | |
| 10,471,847 B1 * | 11/2019 | Han | B60L 3/12 |
| 10,672,199 B2 | 6/2020 | Landolsi et al. | |
| 10,677,848 B2 | 6/2020 | Chow et al. | |
| 10,823,092 B2 | 11/2020 | Bastanipour et al. | |
| 11,072,258 B2 | 7/2021 | Kumar et al. | |
| 11,192,458 B2 | 12/2021 | Lavertu et al. | |
| 11,401,041 B2 | 8/2022 | Baig et al. | |
| 2015/0367950 A1 | 12/2015 | Rajashekara et al. | |
| 2020/0347787 A1 | 11/2020 | Crowley et al. | |
| 2021/0237614 A1 | 8/2021 | Yao et al. | |
| 2021/0253117 A1 | 8/2021 | Choe et al. | |
| 2022/0219567 A1 * | 7/2022 | Mankowski | G01R 31/3828 |
| 2022/0343702 A1 | 10/2022 | Pekar et al. | |
| 2023/0192304 A1 * | 6/2023 | Mattikalli | B64D 35/025 |
| | | | 244/53 R |

* cited by examiner

OVERALL AIRCRAFT SYSTEM DATA COLLECTOR FOR PROGNOSTICS AND HEALTH MANAGEMENT

BACKGROUND

Exemplary embodiments of the present disclosure pertain to the art of aircraft propulsion systems, and more particularly to an aircraft hybrid electric propulsion (HEP) system.

Recent advances in electrical motors, energy storage systems, and power electronics converters (PEC) are leading the aircraft propulsion to become increasingly electrical. Hybrid-electric propulsion (HEP) systems have been developed which implements electrical systems in place of one or more traditional aircraft mechanical systems. Fuel and battery sources, for example, may be implemented to allow more possibilities for managing of the propulsion system in the various stages of a mission, and reduce the energy consumption, compared with traditional. The increase in electrical systems increases the overall load of the aircraft, and produces greater complexity in the operation. In addition, proper management of the electrical components and combustion desirable to meet the environmental requirements and reduce the fuel consumption of the aircraft.

BRIEF DESCRIPTION

A hybrid electric propulsion (HEP) system of an aircraft includes a gas turbine engine configured to generate rotational power, and an electric propulsion system configured to generate at least one of thrust or lift for operation of the aircraft. The propulsion system includes a propulsor and an electric motor configured to drive the propulsor. A controller is in signal communication with the gas turbine engine and the electric propulsion system. The controller operates the gas turbine engine based on an on-board engine model (OEM), monitors electrical parameters of the electric propulsion system, and updates the OEM in response to changes to the electrical parameters.

In addition to one or more features described herein, the controller operates the gas turbine engine based on the updated OEM.

In addition to one or more features described herein, the HEP system includes an on-board long-term storage unit configured to store the electrical parameters recorded during a series of flight missions performed over a given time period.

In addition to one or more features described herein, the controller updates the OEM based on the recorded electrical parameters stored in the on-board long-term storage unit.

In addition to one or more features described herein, the controller operates the electric propulsion system based on an on-board propulsor model (OPM).

In addition to one or more features described herein, to the controller updates the OPM in response to changes to the electrical parameters.

In addition to one or more features described herein, the controller updates the OPM based on the recorded electrical parameters stored in the on-board long-term storage unit.

In addition to one or more features described herein, a battery system having an initial battery capacity and configured to power the electric propulsion system according to the battery capacity.

In addition to one or more features described herein, the HEP controller predicts a depletion in the initial battery capacity based on the based on the recorded electrical parameters stored in the on-board long-term storage unit, and updates one or both of the OEM and the OPM based on the depletion in the initial battery capacity.

In addition to one or more features described herein, the controller predicts a degradation of the propulsion system the based on the recorded electrical parameters stored in the on-board long-term storage unit, and updates one or both of the OEM and the OPM based on the degradation of the propulsion system.

According to another non-limiting embodiment, a method is provided for controlling a hybrid electric propulsion (HEP) system of an aircraft. The method comprises generating, by a gas turbine engine, a rotational power; generating, by an electric propulsion system including a propulsor and an electric motor configured to drive the propulsor, at least one of thrust or lift for operation of the aircraft; operating, by a controller, in the gas turbine engine based on an on-board engine model (OEM); monitoring, by the controller, electrical parameters of the electric propulsion system; and updating the OEM in response to changes to the electrical parameters.

In addition to one or more features described herein, the method includes operating the gas turbine engine based on the updated OEM.

In addition to one or more features described herein, the method further comprises recording the electrical parameters recorded during a series of flight missions performed over a given time period, and storing the recorded electrical parameters in a long-term storage unit on board the aircraft.

In addition to one or more features described herein, the method further comprises updating, by n the controller, the OEM based on the recorded electrical parameters stored in the on-board long-term storage unit.

In addition to one or more features described herein, the method further comprises operating the electric propulsion system based on an on-board propulsor model (OPM).

In addition to one or more features described herein, the method further comprises updating, by the controller, the OPM in response to changes to the electrical parameters.

In addition to one or more features described herein, the method further comprises updating, by the controller, the OPM based on the recorded electrical parameters stored in the on-board long-term storage unit.

In addition to one or more features described herein, the method further comprises powering, by a battery system having an initial battery capacity, the electric propulsion system according to the battery capacity.

In addition to one or more features described herein, the method further comprises predicting, by wherein the controller, a depletion in the initial battery capacity based on the based on the recorded electrical parameters stored in the on-board long-term storage unit, and updating, by the controller, one or both of the OEM and the OPM based on the depletion in the initial battery capacity.

In addition to one or more features described herein, the method further comprises predicting, by the controller, a degradation of the propulsion system the based on the recorded electrical parameters stored in the on-board long-term storage unit, and updating, by the controller, one or both of the OEM and the OPM based on the degradation of the propulsion system.

The above described and other features are exemplified by the following figures and detailed description.

Any combination or permutation of embodiments is envisioned. Additional features, functions and applications of the disclosed assemblies, systems and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Dynamic models are commonly used for gas turbine (including jet engine) control and diagnostics. The control functions may use the estimated engine parameters by the model to close loop for control objectives when the model is implemented onboard, while the diagnostic functions may rely on the diagnostic features for Fault Detection and Isolation (FD&I). A variety of models have been utilized in the industry including, but not limited to, dynamic state variable models (e.g., linear or nonlinear) coupled with a self-tuning function (e.g., a Kalman filter) to match the model to the individual engine to be controlled and monitored. The tuning parameters, a.k.a. the tuners, typically include adjustments to the engine's physical parameters such as component efficiencies and flow capacities. Conventional models, however, do not take into account the health, quality, and deterioration of hybrid propulsion system components such as, for example, the battery, motor, and vibration sensors.

One or more embodiments of the present disclosure provide an adaptive hybrid propulsion control system which dynamically tunes one or more on-board engine models based on the health, quality, and deterioration of hybrid propulsion system components such as, for example, the battery, motor, and vibration sensors, and adjusts control of an aircraft based on the tuned on-board models. Machine learning can be utilized to learn remaining life expectancy of various electrical and/or mechanical components of the HEP system based on usage, measured output signals, and depletion over time. The changing life expectancies overtime are then used to actively tune the on-bord models, and in turn improve the operating efficiency of the aircraft control and perform prognostics of the HEP system. In one or more non-limiting embodiments, a HEP controller can process a tuned model to perform prognostics of the HEP system, e.g., determine an advance indication or portent of a future event. By taking into account the health, quality, and deterioration of hybrid propulsion system components, tuning of the on-board models can be improved, prediction of future faults and failures, increased operating efficiency of the aircraft control overtime can be achieved.

Figure 1:
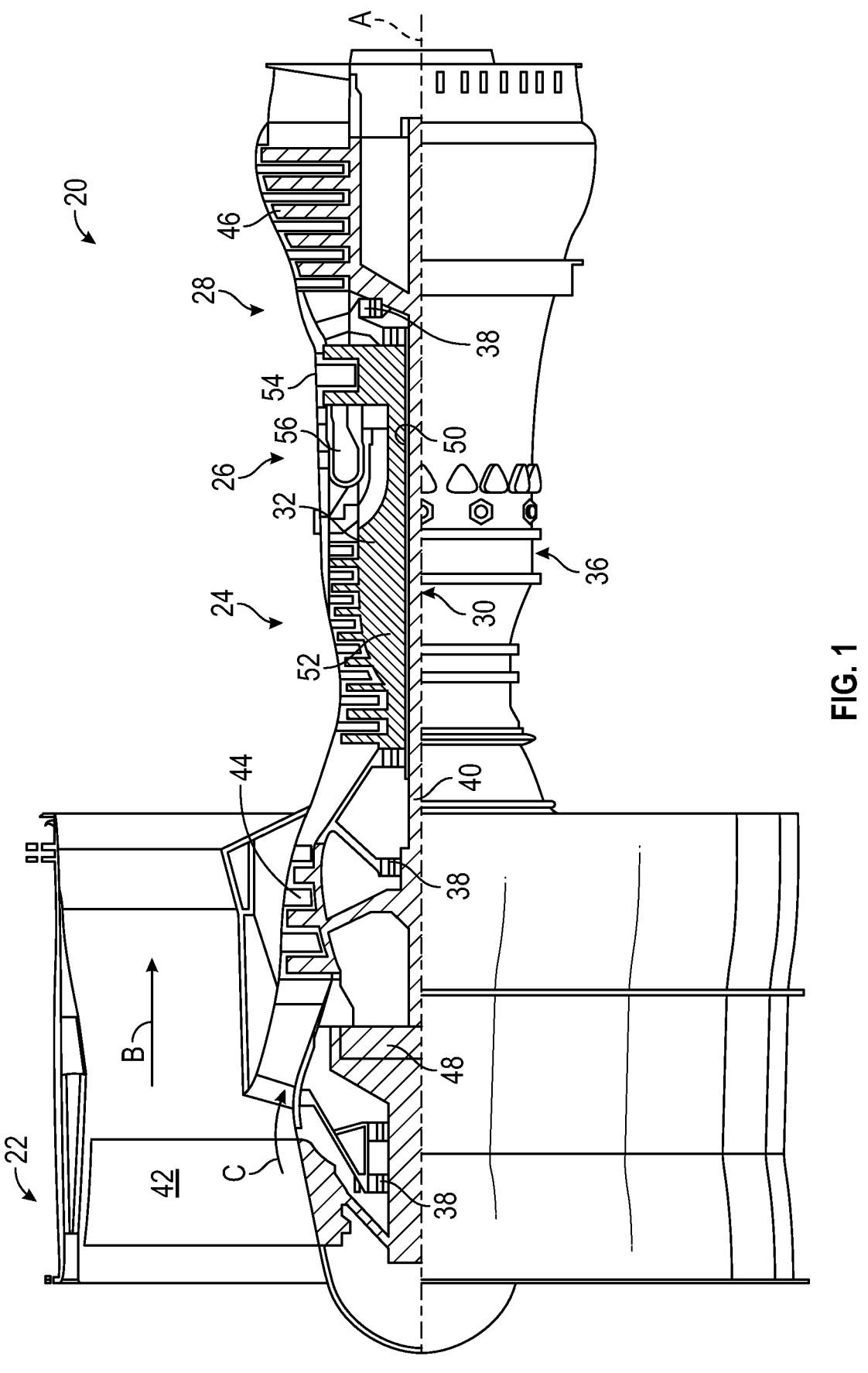
FIG. 1 is a block diagram depicting an aircraft hybrid electric propulsion (HEP) system according to a non-limiting embodiment of the present disclosure.

With reference now to FIG. 1, a gas turbine engine 20 is schematically illustrated according to a non-limiting embodiment of the present disclosure. The gas turbine engine 20 is disclosed herein as a two-spool turbofan that generally incorporates a fan section 22, a compressor section 24, a combustor section 26 and a turbine section 28. In one or more non-limiting embodiments, the gas turbine engine 20 is implemented as a turbo-generator or motor-generator such that the gas turbine engine 20 is coupled with an electrically powered motor-generator. In one or more non-limiting embodiments, the turbo-generator is implemented as a gas turbine engine 20 which couples the turbo-generator to a spool (e.g., high speed spool, low speed spool, etc.). In some examples, the turbo-generator may include two or more motor generators, each motor-generator connected to a different spool (e.g., a first motor-generator coupled to a high speed spool and a second motor-generator coupled to a low speed spool.

The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7°R)] {circumflex over ( )}0.5. The "Low corrected fan tip speed" as disclosed herein according to one non-limiting embodiment is less than about 1150 ft/second (350.5 m/sec).

Figure 2:
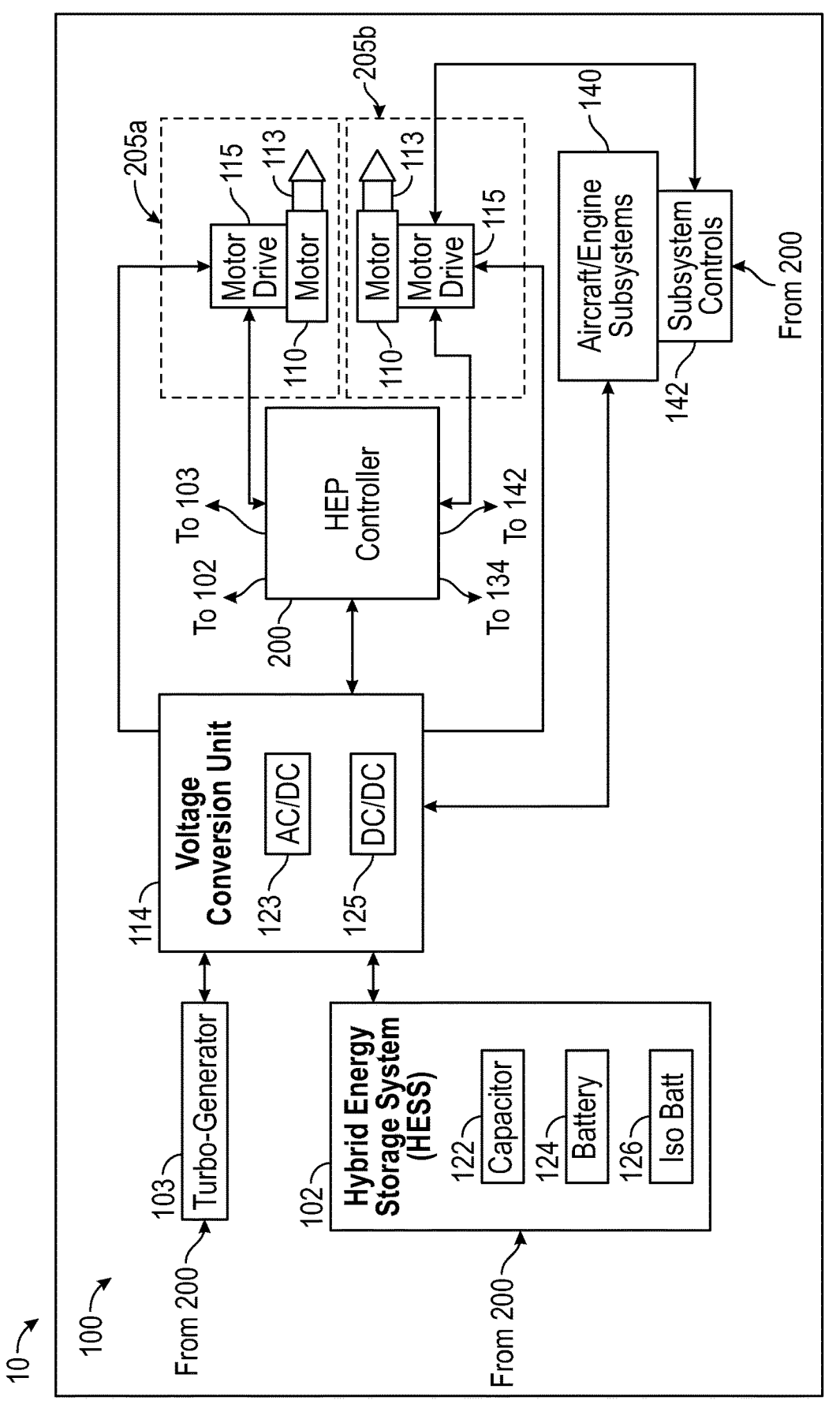
FIG. 2 is a block diagram illustrating a control system configured to enable various operating modes of an aircraft HEP system according to a non-limiting embodiment of the present disclosure.

Turning now to FIG. 2, a hybrid electric propulsion (HEP) system 100 of an aircraft 10 is illustrated according to a non-limiting embodiment of the present disclosure. The aircraft 10 can include a pilot-operated aircraft or an autonomous aircraft (e.g., an unmanned aerial vehicle (UAV). The aircraft system 100 can include a hybrid energy storage system (HESS) 102, one or more electrical propulsion systems 205a and 205b, and a HEP controller 200.

The HESS 102 includes one or more energy storage subsystems 102. The energy storage subsystems 102 can include at least two energy subsystems, for example, having a different power-energy density, power draw characteristics and/or dissimilar configuration/architecture to meet various types of power demands and fault protection with backup power sources. In one non-limiting example, the at least two energy storage subsystems can include a super/ultra-capacitor 122 and a battery 124 system. The battery system 124 is configured to store a limited amount of energy and discharge the stored energy to one or more electrical loads. The super/ultra-capacitor 122 can operate in conjunction with the battery 124 system to control the discharge rate of the energy discharged from the battery 122.

According to a non-limiting embodiment, the hybrid energy storage system 102 (e.g., the battery 124 and/or the capacitor 122) can be sized (e.g., with an initial battery capacity) to store energy to support transient bursts of the gas turbine engine 20 and/or the propulsion systems 205a and 205b for a power assist during a snap acceleration or power shedding during a snap deceleration. Using the energy storage subsystems 102, for example, for a wide range of acceleration and deceleration conditions can result in oversizing battery capacity with corresponding additional weight carried to meet potential transient demands. The super/ultra-capacitor 122, for example, can provide a lower storage capacity than the battery 124 but has a higher charge/discharge rate as compared to the battery 124.

The super/ultra-capacitor 122 can be comprised of one or more electrochemical double layer capacitors (EDLCs) or electrochemical capacitors that have a high energy density when compared to common capacitors, e.g., several orders of magnitude greater than a high-capacity electrolytic capacitor. The super/ultra-capacitor 122 can have higher energy efficiency due to a lower internal resistance than the battery system. The super/ultra-capacitor 122 can be operatively coupled to the battery 124 through a direct current-to-direct current (DC-to-DC) converter, for example. The DC-to-DC converter can convert a voltage level of the battery 124 to match a voltage level of the super/ultra-capacitor 122 to support charging of the super/ultra-capacitor 122 by the battery 124. In alternate embodiments, the DC-to-DC converter can be omitted where regulation between the super/ultra-capacitor 122 and the battery 124 is not needed.

The propulsors 205a and 205b can receive power provided by the turbo-generator 103 and/or the HESS 102. According to a non-limiting embodiments, sources and electrical loads share a common power bus (not shown). If total consumption of the system exceeds the capability of the generator at the time, the HESS 102 (e.g., the battery 124) compensates for the power the difference. Accordingly, the turbo-generator 103 can be controlled such that the HESS 102 (e.g., the battery 124) serves to provide the main power used to drive the propulsors 205a and 205b when the HEP controller 200 determines the HESS 102 can provide sufficient power to allow the aircraft 10 to achieve a controlled landing.

According to a non-limiting embodiment, one or more electric motors 110 are operably coupled to drive a respective fan 113. The combination of the motor 110 and fan 113 can be utilized at least partially with the gas turbine engine 20 to implement the propulsion system 205a and 205b, also referred to herein as a "hybrid propulsor" 205a and 205b. Each motor 110 is driven by a motor drive unit 115. Accordingly, increasing or decreasing the power delivered to the motor 110 increases or decreases, respectively, the thrust produced by the fan 113.

In the example of FIG. 2, the HESS 102 is operably coupled to a voltage conversion unit 114, which can include an AC-to-DC converter 123 and/or a DC-to-DC converter 125 that is operably coupled to the motor drive 115. The motor 110 and/or the motor drive 115 can include one or more motor sensors configured to output motor data indicative of operation of the motor(s) 115. The motor data can include, but is not limited to, motor speed, motor temperature, power consumption, and/or load demand (e.g., power demand).

The voltage converter unit 114 can also interface with a turbo-generator 103, a HEP controller 200, and or more aircraft electrical subsystems 140. According to a non-limiting embodiment, the turbo-generator 103 serves as the main power source, which generates power ultimately used to drive the propulsion system 205*a* and 205*b*. The output generator voltage and its frequency varies based on the design of the turbo-generator 103 and engine speed. The voltage conversion unit 114 (e.g., the AC-DC converter 123) receives the unregulated energy from the turbo-generator 103 and converts it to a steady-steady DC voltage that can be used to drive various DC electrical loads (e.g., via the power bus).

One or more aircraft electrical subsystems 140 are operably coupled to the voltage conversion unit 114 and aircraft/engine subsystem controls 142. The aircraft electrical subsystems 140 can include, but are not limited to, an engine subsystem, an aircraft low-voltage DC subsystem, an aircraft high-voltage DC subsystem, an aircraft AC subsystem, a landing gear system, a navigation system, flight surface systems, and aircraft flight control systems. One or more of the subsystems included in the aircraft electrical subsystems 140 can also include one or more sensors configured to output monitored or sensed data associated with a respective subsystem and/or flight conditions of the aircraft. The sensed data can include, for example, aircraft speed, thrust, aircraft altitude, ambient temperatures, cabin pressure, etc.

The voltage conversion unit 114 can perform various voltage conversions needed to operate the devices and/or systems of the aircraft hybrid electric propulsion system 100. Although only one voltage conversion unit 114 is depicted, it should be understood that multiple voltage conversion units can be incorporated in the aircraft hybrid electric propulsion system 100 and that reference to the voltage conversion unit 114 can include one or more voltage conversion units within the aircraft hybrid electric propulsion system 100.

One or more of the voltage conversion unit 114, the motor drive 115, the generator controls 130, and or aircraft/engine subsystem controls 142 can include inverter/power drive circuitry that applies known power control techniques to control the power, current, speed and/or torque produced by one or more of the electric motor 110, AC/DC converter 123, DC/DC converter 125, generator 132, and aircraft/engine subsystems 140, respectively. For example, during a snap acceleration, electric power from the hybrid energy storage system 102 is provided through the voltage conversion unit 114 and the motor drive 115 (e.g., power conditioning electronics) to drive the electric motor 110 in a motor mode to supplement rotation of the engine shaft as opposed to an engine load. The engine load on the engine shaft, for example, can vary depending upon a flight regime and accessory loading from generators, environmental control systems, engine bleeds, and other known loading factors. During a snap deceleration, the generator 111 can be used to increase the engine load on the engine shaft, with resulting current passed through the voltage conversion unit 114 for storage in the hybrid energy storage system 102 or used elsewhere within the aircraft hybrid electric propulsion system 100.

The aircraft hybrid electric propulsion system 100 further includes a HEP controller 200, which is signal communication with the propulsion system 205*a* and 205*b*, the HESS 102, the turbo-generator 103, and the aircraft/engine subsystem controls 142. The HEP controller 200 can also interface with and control multiple elements of the aircraft hybrid electric propulsion system 100 and the propulsion system 205*a* and 205*b*, such as switches, current sensors, voltage sensors, temperature sensors, communication buses, and the like. According to a non-limiting embodiment, the HEP controller 200 includes one or more high speed communication paths configured to exchange data with all the electric power train components included in the aircraft hybrid electric propulsion system 100. The high speed communication paths can include, but are not limited to, controller area network (CAN) bus signal paths and Aeronautical Radio, Incorporated (ARINC) protocol signal paths. In this manner, the HEP controller 200 can obtain electrical signals, measurements, parameters, and other electrical data at a high rate and use the obtain electrical data to tune on-board models to perform prognostics of the hybrid electric propulsion system 100, e.g., determine an advance indication or portent of a future event.

In an embodiment, the HEP controller 200 includes a memory system to store instructions that are executed by a processing system. The executable instructions may be stored or organized in any manner and at any level of abstraction, such as in connection with a controlling and/or monitoring operation of the aircraft hybrid electric propulsion system 100 and/or the propulsion system 205*a* and 205*b*. The processing system can include one or more processors that can be any type of central processing unit (CPU), including a microprocessor, a digital signal processor (DSP), a microcontroller, an application specific integrated circuit (ASIC), a field programmable gate array (FPGA), or the like. Also, in embodiments, the memory system may include random access memory (RAM), read only memory (ROM), or other electronic, optical, magnetic, or any other computer readable medium onto which is stored data and control algorithms in a non-transitory form. Other controllers of FIG. 2 can include similar elements. In one or more non-limiting embodiments, the memory system is capable of performing long term storage. In this manner, HEP controller 200 can record data from multiple flights and then use the recorded data to improve real-time analysis when performing prognostics of the hybrid electric propulsion system 100 in real-time.

According to one or more non-limiting embodiments, the HEP controller 200 can monitor power output from the turbo-generator 103 based on a generator sensor (not shown) and/or power output generated by the voltage conversion unit 114. When the HEP controller 200 detects power output from the turbo-generator 103, controls the voltage conversion unit 114 (e.g., DC/DC converter 125) to output power generated by the battery 124 to the propulsors 205*a* and 205*b* (e.g., the motor drive 115 and/or the motors 110), along with various electrical systems included among the aircraft subsystems 140.

According to a non-limiting embodiment, the HEP controller 200 stores individual models of various electrical and mechanical systems included in the HEP system 100. Together, the individual models can represent a larger real-time system model of the HEP system 100. Accordingly, the HEP controller 200 can analyze and monitor the individual models simultaneously in order to track the overall behavior of the HEP system, both electrically and mechanically, to perform health monitoring and prognostics of the HEP 100. Based on the prognostics, the HEP controller 200 can adaptively adjust control of the HEP system 100. According to a non-limiting embodiment, if degradation of a fan motor is detected, the HEP controller 200 can transfer power to remaining fan motors to generate a target thrust or maintain target thrust, while delivering less power to one or more loads.

Figure 3:
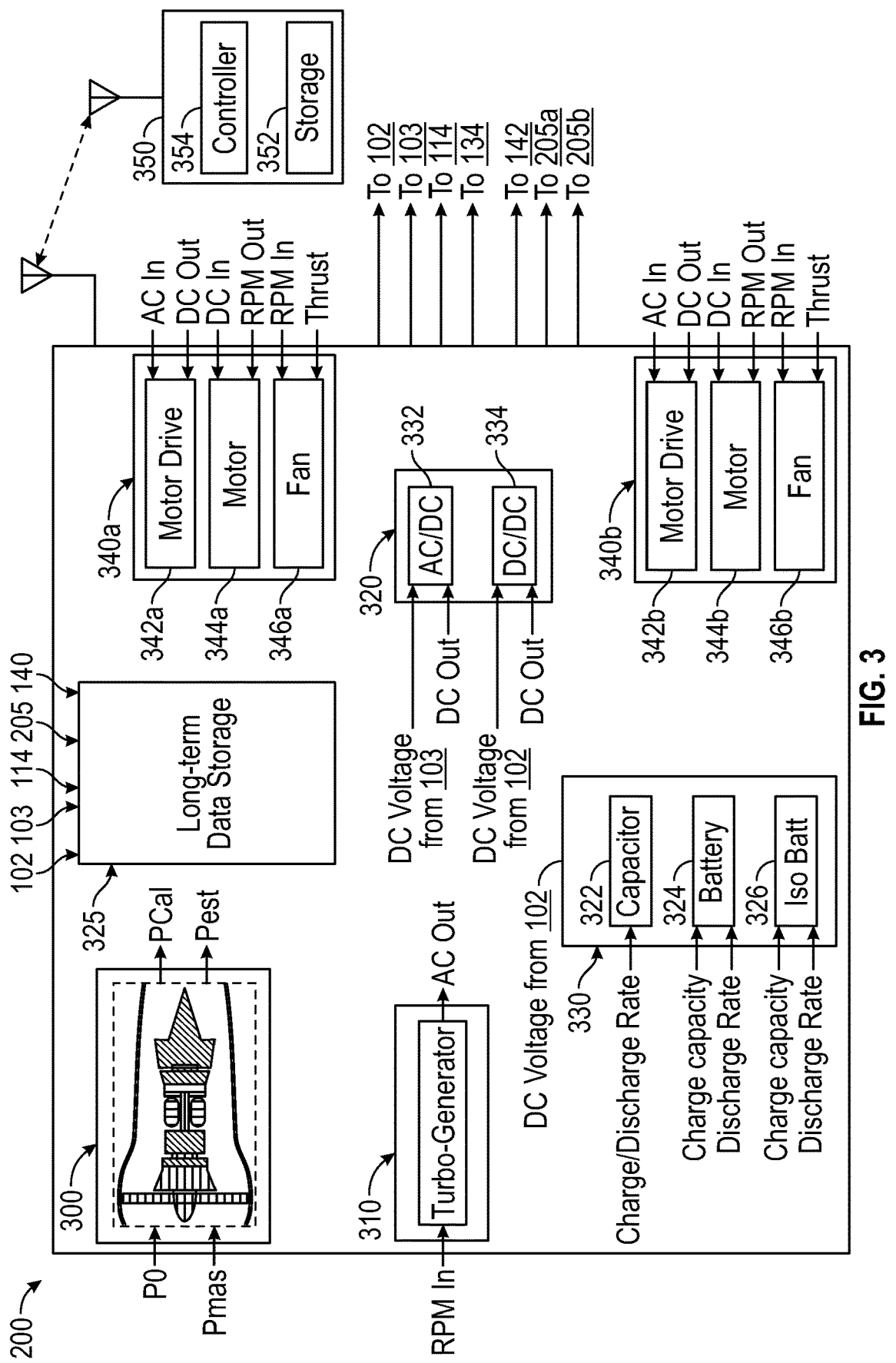
FIG. 3 is a block diagram of an aircraft hybrid electric propulsion (HEP) controller included in the aircraft HEP system shown in FIG. 2 according to a non-limiting embodiment of the present disclosure.

Turning to FIG. 3, the HEP controller 200 is illustrated in greater detail according to a non-limiting embodiment of the present disclosure. As described herein, the HEP controller 200 stores individual models of various electrical systems included in the HEP system 100, which together represent the larger real-time system model of the HEP system 100. The models include, but are not limited to, a nominal engine system model 300, a turbo-general model 310, a voltage conversion unit model 320, a HESS model 330, and one or more electrical propulsion system models 340*a* and 340*b* (also referred to as on-board propulsor models (OPMs)). Although two electrical propulsion system models 340*a* and 340*b* are shown, it should be appreciated that more or less electrical propulsion system models 340*a* and 340*b* can be included (e.g., based on the number of propulsion systems 205*a* and 205*b* installed on the aircraft 10) without departing from the scope of the invention. Any one of the nominal engine system model 300, a turbo-general model 310, a voltage conversion unit model 320, a HESS model 330, and one or more electrical propulsion system models 340*a* and 340*b* can be implemented as an on-board model, which expresses a mathematical relationship between various model input values and their model output values.

In addition, any one of the nominal engine system model 300, a turbo-general model 310, a voltage conversion unit model 320, a HESS model 330, and one or more electrical propulsion system models 340*a* and 340*b* can include a self-tuning unit (not shown) that is configured to receive a one or more parameter differential values (Δ) which are calculated as a difference between one or more measured engine parameter values (mas) and the calculated engine parameters (cal). The self-tuning unit can include a Kalman filter, for example, or other linear quadratic estimation (LQE) filter which continuously updates the calculated input parameter values (cal). Accordingly, each respective self-tuning unit can actively tune its respective model 300, 310, 320, 330, 340*a* and/or 304*b* (e.g., varies the parameters defining the model 300, 310, 320, 330, 340*a* and/or 304*b*) based at least in part on the second parameter differential value (Δ) such that the calculated engine parameters (cal) match the measured engine parameter values (mas).

In one or more non-limiting embodiments, the models 300, 310, 320, 330, 340*a* and/or 304*b* can be actively tuned by adding adjustments to its overall tuners, i.e., the set of model parameters define the respective model (e.g., the efficiency and flow capacity of a component in the model) to be adjusted. In this manner, one or more of the models 300, 310, 320, 330, 340*a* and/or 304*b* can provide outputs with much improved accuracy.

In one or more non-limiting embodiments, the HEP controller 200 can store and execute various machine learning algorithms that utilize a neural network to learn remaining life expectancy of various electrical components (e.g., the battery system) based on component use, real-time measured outputs, and depletion over time. In one or more non-limiting embodiments, electrical parameters associated with component use and the real-time measured outputs can be recorded and stored in an on-board long-term storage unit. Accordingly, the remaining life expectancy of various electrical components (e.g., the battery system and expected battery depletion over the course of a flight mission) can be continuously determined.

In some embodiments, changes in expected battery depletion (e.g., a depletion in the battery system's initial battery capacity) can be predicted based on the recorded electrical parameters associated with component use and the real-time measured outputs stored in an on-board long-term storage unit. In this manner, the HEP controller 200 can dynamically update one or more of the models 300, 310, 320, 330, 340*a* and/or 304*b* to adjust operation of HEP 100 over time based on the predicted changes in changes in expected battery depletion and/or electrical component degradation.

In some embodiments, a degradation of the propulsion system can be predicted based on the recorded electrical parameters associated with component use and the real-time measured outputs stored in an on-board long-term storage unit. In this manner, the HEP controller 200 can dynamically update one or more of the models 300, 310, 320, 330, 340*a* and/or 304*b* to adjust operation of HEP 100 over time based on the predicted degradation of the propulsion system.

The machine learning of the HEP controller can also learn life expectancy of mechanical and/or electrical components of the HEP system 100 such as the propulsor motors 110 and the fans 113, for example, based on changes in the recorded electrical parameters over time and/or on vibration signals output from propulsor vibrations sensors. The changing life expectancies overtime are then used to actively tune the corresponding models 300, 310, 320, 330, 340*a* and/or 304*b*.

With continued reference to FIG. 3, nominal engine system model 300 models a gas turbine engine (e.g., gas turbine engine 20), which is configured to operate according to one or more engine control and environmental parameters (P0). The engine control and environmental parameters (P0) can include various calculated, and/or measured engine operating parameters. These parameters include, but are not limited to, fuel flow, vane angles, engine speed, bleed air flow rate, nozzle area, altitude, ambient air pressure, ambient temperature, and throttle lever angle (TLA). The same control and environmental parameters (P0) are used as inputs to the nominal engine system model 300. The nominal engine system model 300 also receives sensor measurements from one or more sensors installed on the aircraft, and utilizes the P0 inputs and sensor measurements to output one or more estimated engine parameters ($P_{est}$). The estimated engine parameters ($P_{est}$) are fed back into the nominal engine system model 300 and are used along with the sensor measurements to dynamically tune and update the nominal engine system model 300 to match the engine under control.

The turbo-general model 310 models the turbo-generator 103. According to a non-limiting embodiment, the turbo-generator 103 receives a measured RPM input signal indicative of a real-time rotational speed of the turbine shaft included with the turbo-generator 103. According to one or more embodiments, the measured RPM input signal can be provided by a RPM speed sensor coupled to the turbine shaft. The turbo-general model 310 utilizes the measured RPM input signal to generate an estimated AC output voltage and/or AC output current. In one or more non-limiting embodiments, the estimated AC output voltage/current represents an expected AC output voltage and/or expected AC output current that is expected to be output from the turbo-generator 103 based on the measured input RPM of the turbine shaft.

The voltage conversion unit model 320 models the voltage conversion unit 114. According to a non-limiting embodiment, the voltage conversion unit model 320 receives a measured AC input signal indicative of a real-time AC voltage/current generated by the turbo-generator 103 and a measured DC input signal indicative of a real-time DC voltage and/or real-time DC current generated by the HESS 102. According to one or more embodiments, the measured AC input signal can be provided by a voltage sensor and/or current sensor coupled to the AC-to-DC converter 123. Likewise, the measured DC input signal can be provided by a voltage sensor and/or current sensors coupled to the DC-to-DC converter 125.

The voltage conversion unit model 320 utilizes the measured AC input signal to generate a first estimated DC voltage and/or DC current, and utilizes the measured DC input signal to generate a second estimated DC voltage and/or DC current. In one or more non-limiting embodiments, the first estimated DC voltage/current represents an expected DC output voltage and/or expected DC output current (e.g., a converted DC output voltage/current) that is expected to be output from the AC-to-DC converter 123 based on the measured input AC voltage/current generated by the turbo-generator 103. Likewise, the second estimated DC voltage/current represents an expected DC output voltage and/or expected DC output current (e.g., a converted DC output voltage/current) that is expected to be output from the DC-to-DC converter 125 based on the measured input DC voltage/current generated by the HESS 102.

The HESS model 330 models the HESS 102. According to a non-limiting embodiment, the HESS model 330 receives measured DC voltage input signals indicative of a real-time DC voltage output from the HESS 102. The measured DC voltage input signals can include, but are not limited to, a discharged voltage output from the capacitor 122, a discharged voltage from the battery 124, and a discharged voltage from the isolated battery 126. In addition, the HESS model 330 can include a capacitor sub-model 322, a battery sub-model 324, and an isolated battery sub-model 326, which model the capacitor 122 the battery 124, and the isolated battery 126, respectively. The capacitor sub-model 322 can receive as an input a charge/discharge rate of the capacitor 122. The battery sub-model 324 can receive as an input a charge/discharge rate of the battery 124. The isolated battery sub-model 326 can receive as an input a charge/discharge rate of the isolated battery 126.

According to one or more embodiments, the measured DC voltage input signals can be provided by one or more voltage sensors coupled to the capacitor 122, the battery 124, and the isolated battery 126. The HESS model 330 utilizes one or more of the measured DC voltage input signals to generate estimated DC voltages. In one or more non-limiting embodiments, the estimated DC voltages represent an expected DC voltage that is expected to be output from the capacitor 122, the battery 124, and the isolated battery 126.

The electrical propulsion system models 340a and 340b both work to model the various components of the propulsion systems 205a and 205b. According to a non-limiting embodiment, each of the electrical propulsion system models 340a and 340b include motor drive sub-model 342a/342b, a motor sub-model 344a/344b, and a fan sub-model 346a/346b. The motor drive sub-model 342a and 342b models the motor drive 115.

Each of the electrical propulsion system models 340a and 340b receive a measured input signals indicative of a real-time measurements associated with the propulsion systems 205a and 205b, respectively. According to one or more embodiments, the motor drive sub-model 342a/342b receives a measured AC voltage/current input signal (e.g., provided by the AC-to-DC converter 123). The motor drive sub-model 342a/342b utilizes the measured AC voltage/current to estimate the DC output voltage/current expected to be generated by the motor drive 115 to drive the motor 110.

The motor sub-model 344a/344b receives a measured DC input voltage/current provided by the motor drive 115. The motor drive sub-model 342a/342b utilizes the measured DC voltage/current to generate an estimated RPM output signal indicative of the rotational speed of the motor shaft that is expected based on the measured DC input voltage/current.

The fan sub-model 346a/346b receives the measured RPM input provided by the motor 110. The fan drive sub-model 346a/346b utilizes the measured RPM signal to generate an estimated thrust output indicative of an expected thrust output from the fan 113 based on the measured input RPM signal (e.g., generated by the motor 110).

The HEP controller 200 further includes a long-term data storage module 325. In one or more non-limiting embodiments, the long-term data storage module 325 is capable of performing long term data storage. For example, the long-term data storage module 325 can store operating data associated with turbo-generator 200, the HESS 102, the voltage conversion unit 114, and/or the electrical propulsion systems 205a and 205b recorded during a series of flight missions performed over a given time period. In this manner, HEP controller 200 can record data from multiple flights and then use the recorded data to improve real-time analysis when performing prognostics of the hybrid electric propulsion system 100 in real-time.

In one or more non-limiting embodiments, the HEP controller 200 can utilize the recorded electrical parameters associated with the HESS 102, the voltage conversion unit 114, and/or the electrical propulsion systems 205a and 205b to updated one or more of the nominal engine system model 300, the turbo-general model 310, the voltage conversion unit model 320, the HESS model 330 and the electrical propulsion system models 340a, 340b. For example, the one or more components or electrical systems associated with the HESS 102, the voltage conversion unit 114, and/or the electrical propulsion systems 205a and 205b may degrade over time, which in turn can vary their electrical outputs. The changes in the electrical outputs can be recorded in the long-term data storage module 325 and therefore detected by the HEP controller 200 upon mission startup and/or during real-time. Accordingly, the HEP controller 200 can monitor the changes in electrical outputs (e.g., due to component aging or deterioration) and update one or more of the nominal engine system model 300, the turbo-general model 310, the voltage conversion unit model 320, the HESS model 330 and the electrical propulsion system models 340a, 340b based on the recorded changes in electrical outputs to maintain a target operating efficiency of the aircraft 10. Because the long-term data storage module 325 is installed on-board the aircraft 10, the HEP controller 200 can dynamically perform real-time updates and adjustments of one or more of the nominal engine system model 300, the turbo-general model 310, the voltage conversion unit model 320, the HESS model 330 and the electrical propulsion system models 340a, 340b in response to changes in electrical performance, electrical parameters and/or electrical outputs.

In one or more non-limiting embodiments, the HEP controller 200 can wirelessly communicate with a server 350 located remotely from the aircraft 10. The server 350 can include a data storage unit 352 and a controller 354. Accordingly, the HEP controller 200 can conserve storage and processing power by offloading (wireless transmitting) one or more of the nominal engine system model 300, the turbo-general model 310, the voltage conversion unit model 320, the HESS model 330, and the electrical propulsion system models 340a and 340b to the server 350, along with one or more of the measured parameters and/or estimated parameters. The controller 354 can then execute the models and transmit the results back to the HEP controller 200. In this manner, the HEP controller can still perform prognostics of the HEP system 100 while conserving on-board data storage capacity (e.g., memory) and processing resources.

In one or more non-limiting embodiments, the HEP controller 200 can analyze the measured electrical signals input to a given model 300, 310, 320, 330, 340 and/or 340*b* to perform prognostics and proactively detect faults corresponding to an electrical system included in the HEP system 100. For example, as the motors 344*a*/344*b* degrade over time, high-frequency harmonics will begin to appear in the real-time measured DC voltage/current signals. Accordingly, the HEP controller 200 can compare the real-time measured DC voltage/current signals associated with the motor 344*a*/344*b* provided by motor voltage/current sensors to nominal measured DC voltage/current signals obtained during initial testing of the motors 344*a*/344*b* or when the motors 344*a*/344*b* are first introduced into the field. When high-frequency harmonics appearing in the real-time DC voltage/current signals do not exist at the same locations of the nominal measured DC voltage/current signals, the HEP controller 200 can detect the presence of a fault or predict the future occurrence of a fault in the electrical system associated with the motors 344*a*/344*b* and/or a mechanical components associated with the motors 344*a*/344*b*.

As described herein, one or more embodiments of the present disclosure provide an adaptive hybrid propulsion control system which can dynamically tune one or more on-board engine models based on the health, quality, and deterioration of hybrid propulsion system components such as, for example, the battery, motor, and vibration sensors, and adjusts control of an aircraft based on the tuned on-board models. In one or more non-limiting embodiments, a HEP controller can process a tuned model to perform prognostics of the HEP system, e.g., determine an advance indication or portent of a future event. By taking into account the health, quality, and deterioration of hybrid propulsion system components, tuning of the on-board models can be improved, prediction of future faults and failures, increased operating efficiency of the aircraft control overtime can be achieved.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure is not limited to the particular embodiment disclosed as the best mode contemplated for carrying out this present disclosure, but that the present disclosure will include all embodiments falling within the scope of the claims.

What is claimed is:

1. A hybrid electric propulsion (HEP) system of an aircraft, the HEP system comprising:
   a gas turbine engine configured to generate rotational power;
   an electric propulsion system configured to generate at least one of thrust or lift for operation of the aircraft, the electric propulsion system comprising a propulsor and an electric motor configured to drive the propulsor;
   a battery system having an initial battery capacity and configured to power the electric propulsion system; and
   a controller in signal communication with the gas turbine engine and the electric propulsion system, the controller configured to operate the gas turbine engine based on an on-board engine model (OEM), to operate the electric propulsion system based on an on-board propulsor model (OPM), to monitor electrical parameters of the electric propulsion system, and to update the OEM in response to changes to the electrical parameters,
   wherein the controller predicts a degradation of the electric propulsion system and updates the OEM based on the predicted degradation of the electric propulsion system,
   wherein the HEP controller predicts a depletion in the initial battery capacity based on recorded electrical parameters stored in an on-board long-term storage unit, and dynamically updates one or both of the OEM and the OPM based on the depletion in the initial battery capacity.

2. The HEP system of claim 1, wherein the controller operates the gas turbine engine based on the updated OEM.

3. The HEP system of claim 2, wherein the HEP system includes the on-board long-term storage unit configured to store the electrical parameters recorded during a series of flight missions performed over a given time period.

4. The HEP system of claim 3, wherein the controller updates the OEM based on the recorded electrical parameters stored in the on-board long-term storage unit.

5. The HEP system of claim 1, wherein to the controller updates the OPM in response to changes to the electrical parameters.

6. The HEP system of claim 5, wherein the controller updates the OPM based on the recorded electrical parameters stored in the on-board long-term storage unit.

7. The HEP system of claim 5, wherein the controller predicts the degradation of the electric propulsion system the based on the recorded electrical parameters stored in the on-board long-term storage unit, and updates one or both of the OEM and the OPM based on the degradation of the electric propulsion system.

8. A method of controlling a hybrid electric propulsion (HEP) system of an aircraft, the method comprising:
   generating, by a gas turbine engine, a rotational power;
   powering, by a battery system having an initial battery capacity, an electric propulsion system;
   generating, by the electric propulsion system including a propulsor and an electric motor configured to drive the propulsor, at least one of thrust or lift for operation of the aircraft;
   operating, by a controller, in the gas turbine engine based on an on-board engine model (OEM) and the electric propulsion system based on an on-board propulsor model (OPM);

monitoring, by the controller, electrical parameters of the electric propulsion system; and recording the electrical parameters stored in an on-board long-term storage unit; and predicting, by the controller, a degradation of the propulsion system based on the recorded electrical parameters stored in the on-board long-term storage unit;

updating, by the controller, one or both of the OEM and the OPM based on the degradation of the electric propulsion system;

predicting, by wherein the controller, a depletion in the initial battery capacity based on the recorded electrical parameters stored in the on-board long-term storage unit; and dynamically updating, by the controller, one or both of the OEM and the OPM based on the depletion in the initial battery capacity.

9. The method of claim 8, further comprising operating the gas turbine engine based on the updated OEM.

10. The method of claim 9, wherein the recording of the electrical parameters is performed during a series of flight missions performed over a given time period; and storing the recorded electrical parameters in the long-term storage unit on board the aircraft.

11. The method of claim 10, further comprising updating, by the controller, the OEM based on the recorded electrical parameters stored in the on-board long-term storage unit.

12. The method of claim 8, further comprising updating, by the controller, the OPM in response to changes to the electrical parameters.

13. The method of claim 12, further comprising updating, by the controller, the OPM based on the recorded electrical parameters stored in the on-board long-term storage unit.

\* \* \* \* \*